July 18, 1950 C. W. CRUMRINE 2,515,947
ANIMAL TRAP
Filed June 16, 1944 4 Sheets-Sheet 1

INVENTOR.
CHESTER W. CRUMRINE
BY
Bean, Brooks, Buckley & Bean.
ATTY.

July 18, 1950 C. W. CRUMRINE 2,515,947
ANIMAL TRAP
Filed June 16, 1944 4 Sheets-Sheet 2

INVENTOR.
CHESTER W. CRUMRINE
BY
Beau, Brooks, Buckley & Beau.
ATTY.

July 18, 1950 — C. W. CRUMRINE — 2,515,947
ANIMAL TRAP

Filed June 16, 1944 — 4 Sheets-Sheet 3

INVENTOR.
CHESTER W. CRUMRINE
BY
Beau, Brooks, Buckley & Beau.
ATTY.

July 18, 1950        C. W. CRUMRINE        2,515,947
ANIMAL TRAP

Filed June 16, 1944                                 4 Sheets-Sheet 4

INVENTOR.
CHESTER W. CRUMRINE

Patented July 18, 1950

2,515,947

UNITED STATES PATENT OFFICE 2,515,947

ANIMAL TRAP

Chester W. Crumrine, Irondequoit Township, Monroe County, N. Y., assignor, by mesne assignments, to L F C Corporation, Rochester, N. Y., a corporation of New York Application June 16, 1944, Serial No. 540,563

10 Claims. (Cl. 43—74)

1

This invention relates to animal traps and particularly to improvements in the basic form of animal trap disclosed in my prior co-pending application Serial No. 493,988, filed July 9, 1943, which matured as Patent No. 2,360,651 on October 17, 1944.

In the animal trap of the above identified application for Letters Patent means are provided whereby, after an initial trapping impulse set off by the presence of an animal in a predetermined trapping zone, the successive electrocution of the animal, disposal of the body, and resetting of the various instrumentalities are carried on automatically, and what is of importance in these devices, quietly and in such manner as not to arouse the suspicion of other animals in the vicinity of the trap.

In the animal trap which forms the subject matter of the present application the operation of executing the animal by electrocution is completed before movement of the animal to a point of ejection from the initial trapping means, for reasons of safety. For further reasons of safety other features of the design of the present animal trap contribute to protect those who might be in the vicinity of the trap during operation.

The animal trap of the present invention presents various other advantages in construction and operation which will occur to those skilled in the art from a consideration of the following detailed specification and the accompanying drawings. While a full and complete embodiment is set forth herein by way of illustration, it is to be understood that the principles of the invention are not limited excepting as defined in the appended claims.

In the drawings.

Throughout the several figures of the drawings, like characters of reference denote like

Figure 1:
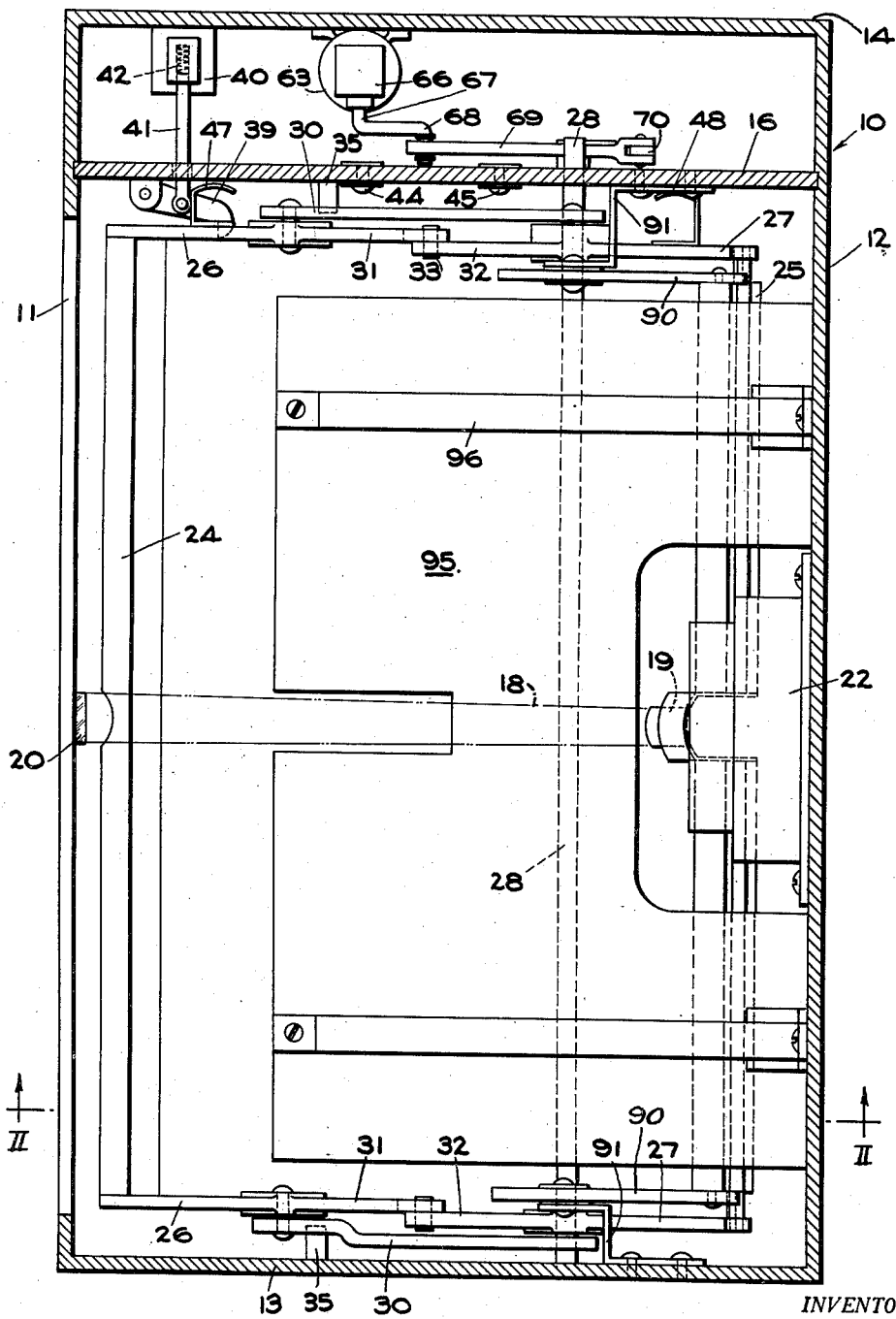
Fig. 1 is a top plan view of one form of the trap of the present invention with the casing portion shown in cross section.

2 parts and the numeral 10 designates generally a casing having side walls 11 and 12, front and rear end walls 13 and 14, and a top or closure 15. A transverse partition wall 16, see Fig. 1, is provided to give bearing support to certain of the moving parts of the device. It will be noted that the front and rear walls 13 and 14 are cut away at their lower edges, whereby to provide a clear passageway 17 extending entirely through the device.

Figure 2:
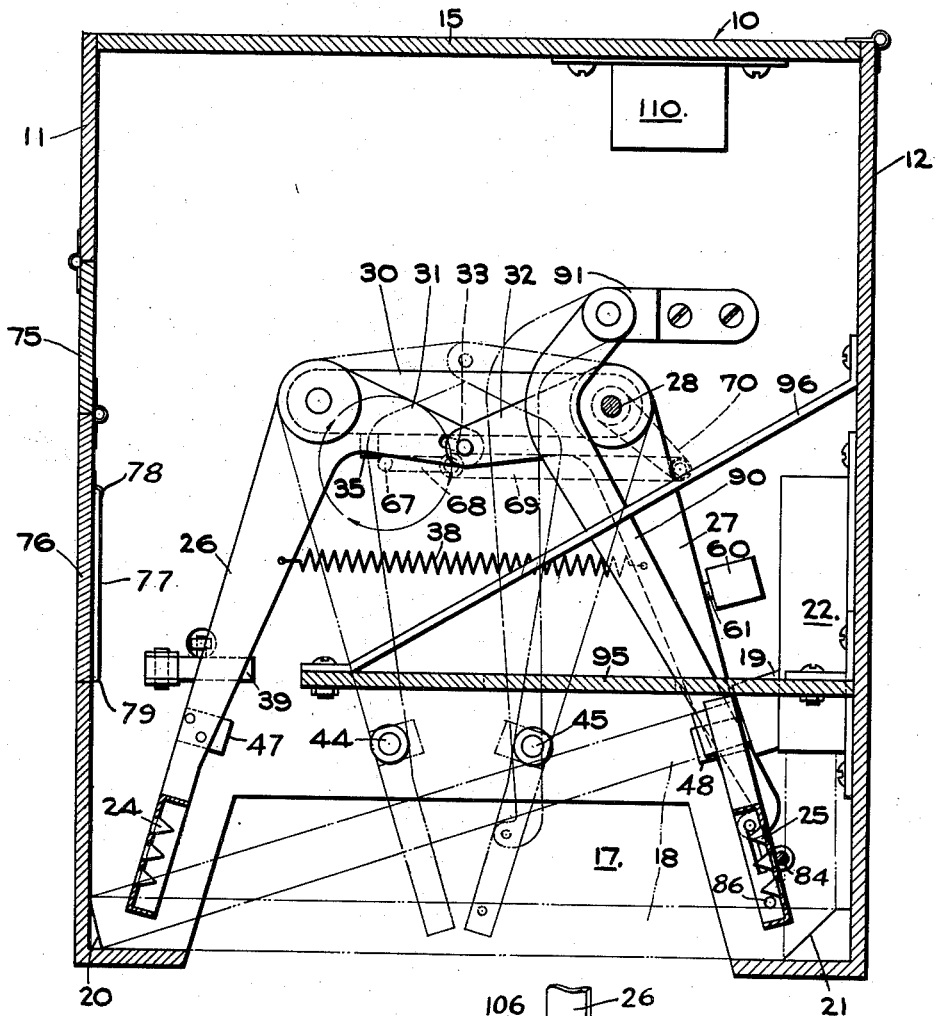
Fig. 2 is a cross sectional view taken on the line II—II of Fig. 1.
Figure 6:
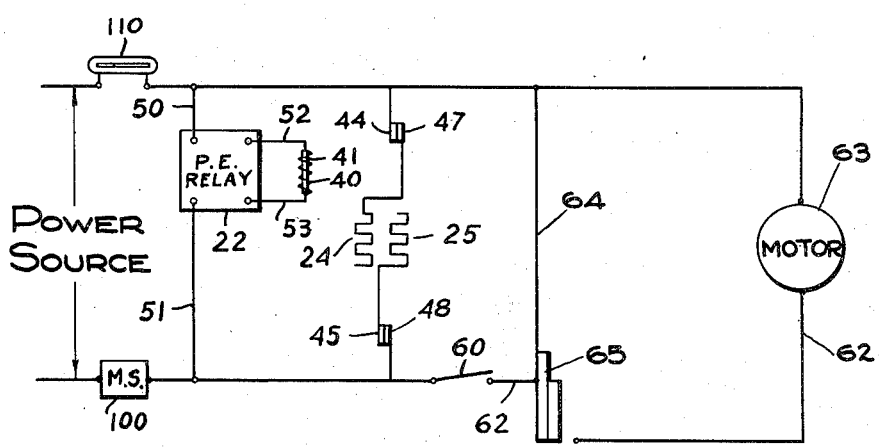

An animal passing through the passageway 17 interrupts a light beam 18 which emanates from a light source 19 and is reflected across the lower part of the passageway 17 by a mirror 20 located at the opposite side of the casing from the light source. A mirror 21 beneath the light source reflects the beam 18 upwardly into a casing 22 which contains a photoelectric cell or other light sensitive device. The details of this part of the trap will readily be understood by those skilled in the art without further delineation; a commercial G. E. photoelectric relay, which includes a photoelectric cell and suitable electronic amplifying devices, may be employed. The photoelectric relay has input leads 50 and 51 and output leads 52 and 53 as shown in Fig. 6. By arranging the casing 22, the light source 19, and the mirrors 20 and 21 as illustrated in Fig. 2, it is possible to conveniently position all of the electrical parts which set the trap into operation at one point in the casing 10. The light source 19 may include suitable optical devices for converging and concentrating the available light into a suitable beam pattern.

The animal securing and disposing elements comprise a pair of opposed plate or panel members 24 and 25 which are mounted for swinging movement toward and away from each other by means of pairs of arms 26 and 27, respectively. The arms 27 are arranged to have a fixed pivot axis by reason of the provision of a pivot shaft 28 which is journaled at its ends in the front wall 13 and the intermediate partition wall 16.

One end of each of a pair of links 30 has a bearing on pivot shaft 28. The opposite end of each link 30 rests upon a fixed block 35 and pivotally supports one of the arms 26 of plate member 24. The arms 26 and 27 form parts of bell cranks whose other arms 31 and 32, respectively, extend generally toward each other as appears from Figs. 2 and 3. Each pair of the arms 31 and 32 have a pin and slot connection 33 which causes them to oscillate synchronously on their respective pivot axes, albeit in opposite directions.

The full line position of Fig. 2 illustrates the set position of the trap with the plates 24 and 25 urged toward each other, by extension spring 38 engaging the arms 26 and 27, but held in set position by a latch 39 which is pivotally mounted on the partition 16, as is best illustrated in the upper left-hand corner of Fig. 1, and engages the inner edge of one of the arms 26. Referring further to Fig. 1, the numeral 40 designates an electromagnet connected to the output leads 52 and 53 of the photoelectric relay whose armature 41 extends to pivotal engagement with latch 39. A spring 42 normally urges the armature outwardly but energization of the electromagnet 40 withdraws latch 39 incident to setting off of the trap.

The electrical arrangement is such that interruption of the light beam 18 activates the photoelectric relay to close a microswitch contained in the relay unit and momentarily energize electromagnet 40. When this is done plates 24 and 25 move instantaneously to the dot and dash line position of Fig. 2 where they engage forcibly against an animal therebetween. The numerals 44 and 45 designate electrical contact buttons which comprise the terminals of a conventional 110 volt lighting circuit and the arms 26 and 27 which are adjacent to the partition wall 16 are provided with resilient contact elements 47 and 48 which are so disposed as to engage the buttons 44 and 45 when the arms move to the dot and dash line position of Fig. 2. This automatically establishes an electrocuting circuit including the plates 24 and 25 and it is found that the voltage indicated is sufficient to effectively electrocute rats, for instance, in a fairly brief period of time. Means are provided for retaining the plates 24 and 25 automatically in the dot and dash line position of Fig. 2 for whatever period of time is determined to be a safe minimum.

In Fig. 2 the numeral 60 designates a normally closed microswitch which, when the trap is in set position, is held open by engagement of one of the arms 27 with a button 61 thereof. As soon as the trap is sprung the arm 27 releases the button 61 and the switch 60 closes and remains closed until the arm 27 returns to the full line position of Fig. 2 at the conclusion of a trapping, disposing and resetting cycle of operation. The switch 60 is in a circuit 62, Fig. 6, which includes an electric motor 63.

Operation of the electric motor is not desired to begin until a sufficient electrocution period has elapsed, which period may be of the order of a minute or so. For this reason the switch 60 has a shunt connection 64 which includes a bimetal switch element 65 and the motor 63 will not be energized until the bimetal switch heats sufficiently to complete the main motor circuit 62. The choice of a suitable thermostatic switch will of course be governed by the desired length of the electrocution period.

The motor 63 is supported against end wall 14 and is provided with suitable reducing gearing indicated at 66 whereby a crank shaft 67 extending therefrom operates at a speed in the neighborhood of two revolutions per minute, which would result in an animal disposing cycle of thirty seconds duration. Rotation of the crank shaft in a clockwise direction as viewed in Fig. 2 moves a crank 68 of crank shaft 67 to the position of Fig. 3, which shifts a link 69 to the right as viewed in those figures and oscillates an arm 70 fixed to rock shaft 28.

Figure 3:
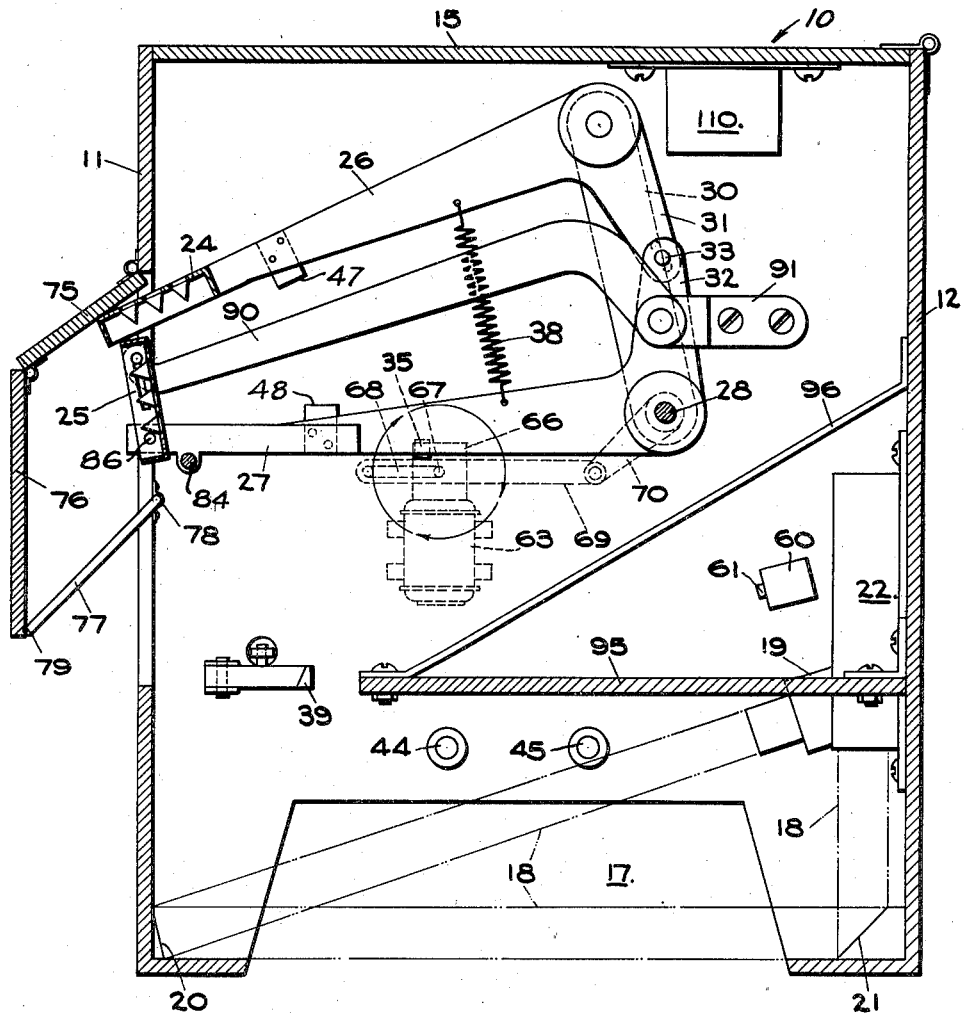
Fig. 3 is a view similar to Fig. 2 but with the parts shown in another position in the cycle of trap operation.

The first half revolution of the crank shaft 67 accordingly oscillates the arm 70 from the position illustrated in Fig. 2 to the position of Fig. 3 and the arms 27, which are fixed to the pivot shaft 28, raise the arms 26 to the position of Fig. 3, the arms 27 meanwhile, through cooperation between arms 31 and 32, themselves moving to the position of Fig. 3. The links 30 meanwhile serve to maintain the proper center relationship between the arms 26 and 27.

The side wall 11 of the casing is fitted with closure means comprising a panel element 75 hinged at its upper edge to the wall 11 and a further panel 76 hinged at its upper edge to the lower edge of panel 75. Panels 75 and 76 normally depend by reason of their own weight to close an ejection-opening formed in the wall 11. However, impingement of the plate 24 against the panel 75 moves it to the position of Fig. 3 and a bail element 77, hinged to the side wall 11 at 78 and to the lower edge of the panel 76 as at 79, constrains the panel 76 to its illustrated vertical position. This means prevents accidental ingress into the trap casing and accidental contact of persons with the electrocution instrumentalities. It is to be noted, however, that the electrocuting circuit itself is broken as soon as the arms 26 and 27 move from the dot and dash line position of Fig. 2.

Figure 5:
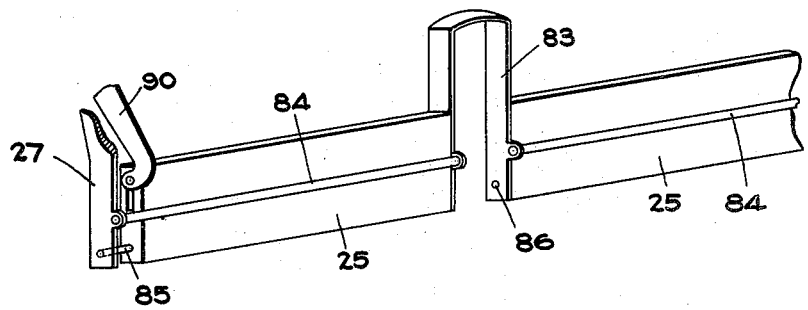
Fig. 5 is a fragmentary perspective view of a portion of an animal engaging plate showing further details thereof; and, Fig. 6 is a wiring diagram showing the electrical connections for effecting an automatic trapping cycle of operation.

The position in which the arms are shown in Fig. 3 is what may be termed the animal ejecting position and in addition to moving the arm to such position it is desired to positively evacuate the trapped animal from between the plates 24 and 25. To this end the plate 25 is movable with respect to its supporting arms 27, although the plate 24 may be rigid with respect to its supporting arms 26. As illustrated in detail in Fig. 5, the plate 25 is in two spaced sections to avoid interference with the light beam 18 when the plates are moving to their final reset position.

An inverted U-shaped bracket 83 bridges the space between the sections of plate 25 and is connected with the opposite arms 27 by rods 84 which may be riveted to the arms 27 and the bracket 83. The two sections of the plate 25 are each pivoted at their lower ends to both of the arms 27 and both legs of the bracket 83, as shown at 85 and 86, respectively. The plates 25 are accordingly movable with respect to the arms 27 and the bracket 83 by pivotal movement about their lower edges.

To control such pivotal movement the upper end portions of the plates 25 are slotted for pivotal engagement with the outer ends of arms 90 which are pivotally supported at their upper ends by brackets 91 secured to the partition wall 16 and the front wall 13 of the casing. The plates 25 are thus constrained substantially to their normal illustrated full line and dot and dash line positions of Fig. 2, wherein the pivot of arm 90, the pivot shaft 28 and the pivots of the plate 25 are in approximately a straight line relationship. However, when arms 27 move to the position of Fig. 3 and the pivot of arm 90, the pivot shaft 28, and the pivots 85 and 86 of plate 25 form substantially a right angle, the action of arm 90 is to rotate the plate 25 in a counterclockwise direction relative to arms 27 and it is believed that the manner in which such action ejects an electrocuted animal from the trap is obvious from a consideration of Fig. 3.

To provide means for restraining upward movement of an animal during closure of the plate elements 24 and 25, a horizontal baffle 95 extends from a side wall 12 and may be reinforced by means of brackets 96. The baffle forms in effect an upper limit or boundary for the trapping zone.

Figure 4:
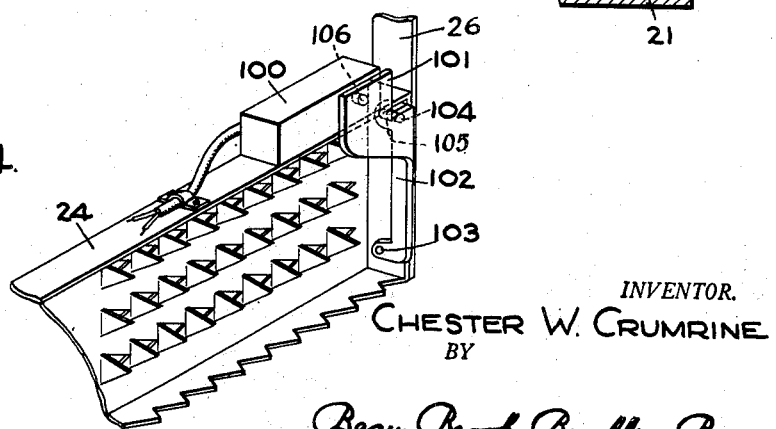
Fig. 4 is a fragmentary perspective view of one of the animal engaging plates.

To safeguard against harm resulting from closure of the trap when the hand of a person or the like is present in the ends of the passageway 17, each end of plate 24 is provided with a safety device illustrated in detail in Fig. 4. This device comprises merely a normally closed microswitch 100 fixed to plate 24 and openable by pressure against the operating button 106 thereof from a plate element 101 which is formed at the upper end of an arm 102 which is pivoted at its lower end to the plate 24 as at 103. Pivotal movement of arm 102 is limited by a pin 104 which is fixed to and projects from the end wall of plate 24 and engages in a slot 105 in arm 102. It will be noted from Fig. 4 that the plate portion 101 of arm 102 is at right angles to the arm per se. The plate portion 101 will only depress the operating button of microswitch 100 when pressure is exerted against arm 102, as when such arm presses against an object caught between the closing plates 24 and 25. Opening of microswitch 100 cuts all of the operating circuits of the trap.

In Figs. 2 and 3 the numeral 110 designates a conventional mercury switch which is effective upon tilting of the trap casing to break all of the operating circuits of the trap. The degree of tilting required to bring the switch 110 into play is obviously variable to suit the particular circumstances.

When light beam 18 is interrupted by the presence of an animal in passage 17, photoelectric relay 22 operates to energize electromagnet 40 which withdraws latch 39 and causes spring 38 to close plates 24 and 25 and clamp the animal therebetween. This closes the electrocuting circuit by engagement of contacts 47 and 48 with terminals 44 and 45, respectively. This movement frees the button 61 of normally closed switch 60 which closes and energizes bi-metal switch 65 and after a brief period sufficient to electrocute the animal, further closes the circuit of motor 63. When motor 63 operates, crank 68, through link 69, oscillates arm 70 to move the arms 24 and 25 as a unit to the position of Fig. 3, whereupon animal ejection through the arms 90 takes place as previously described. Continued rotation of crank 68 through a second 180° of movement restores arm 70. As arms 26 and 27 make their return movement, arm 26 is picked up by latch 39 in its desired preset position, and arm 27 continues to be oscillated by arm 70 until it strikes button 61 and opens switch 60, cutting off motor 63. The trap is then fully reset.

What is claimed is:

1. An animal trap comprising a casing having a trapping zone and a disposal zone, a pair of depending members swingable toward each other and having plate means at their lower ends to trap an animal therebetween in said trapping zone, means normally disposing said depending members in open position, means for moving said members to and holding them in entrapping position, means for moving said depending members laterally as a unit to move an animal trapped between said plate means to said disposal zone, said casing having a side wall opening at said disposal zone, and a normally closed closure element therefor, said closure element being moved to open position by and upon movement of said plate means to said disposal zone to permit ejection of an animal body through said opening, and means for releasing an animal body from between said plate means at said disposal zone.

2. An animal trap comprising a casing having a trapping zone and a disposal zone, a pair of depending members swingable toward each other to trap an animal therebetween in said trapping zone, means for swinging said members toward each other to an entrapping position and for moving them laterally as a unit to move an animal trapped therebetween to said disposal zone, said casing having a side wall opening at said disposal zone, and a normally closed closure element therefor, said closure element being moved to open position by and upon movement of said depending members to said disposal zone to permit ejection of an animal through said opening, and means for releasing an animal body from between said depending members at said disposal zone.

3. An animal trap comprising a casing having a trapping zone and a disposal zone, a pair of depending members swingable toward each other and having plate means at their lower ends to trap an animal therebetween in said trapping zone, means normally disposing said depending members in open position, means for moving said members to and holding them in entrapping position, means for moving said depending members laterally as a unit to move an animal trapped between said plate means to said disposal zone, said casing having a side wall opening at said disposal zone, and a normally closed closure element therefor, said closure element being moved to open position by and upon movement of said plate means to said disposal zone to permit ejection of an animal body through said opening, one of said plate means being pivotally connected to its associated depending member at its lower edge for movement about a horizontal axis and adapted upon terminal movement to said disposing zone to rotate to move its upper edge toward the other plate means to traverse the space therebetween and dislodge a trapped animal.

4. An animal trap comprising a casing having a trapping zone and a disposal zone, a pair of depending members swingable toward each other to trap an animal therebetween in said trapping zone, means for swinging said members toward each other to an entrapping position and for moving them laterally as a unit to move an animal trapped therebetween to said disposal zone, said casing having a side wall opening at said disposal zone, flexible closure means secured adjacent the top of said opening and normally depending thereacross, said closure means being moved to open position by and upon engagement of said depending members thereagainst upon movement to said disposal zone, and means for releasing an animal body from between said depending members at said disposal zone.

5. An animal trap comprising a casing having a trapping zone and a disposal zone, a pair of depending members swingable toward each other and having plate means at their lower ends to trap an animal therebetween in said trapping zone, means for swinging said members toward each other to an entrapping position and for moving them laterally as a unit to move an animal trapped between said plate means to said disposal zone, said casing having a side wall opening at said disposal zone, flexible closure means secured adjacent the top of said opening and normally depending thereacross, said closure means being moved to open position by and upon engagement of said plate means thereagainst upon movement to said disposal zone, and means for releasing an animal body from between said depending members at said disposal zone.

6. An animal trap comprising a casing having a trapping zone and a disposal zone, a pair of depending members swingable toward each other and having plate means at their lower ends to trap an animal therebetween in said trapping zone, means for swinging said members toward each other to an entrapping position and for moving them laterally as a unit to move an animal trapped between said plate means to said disposal zone, said casing having a side wall opening at said disposal zone, flexible closure means secured adjacent the top of said opening and normally depending thereacross, said closure means being moved to open position by and upon engagement of said plate means thereagainst upon movement to said disposal zone, one of said plate means being movable with respect to its depending member and means for automatically moving it to dislodge a trapped animal at said disposal zone.

7. An animal trap comprising a casing having a trapping zone and a disposal zone, a pair of depending members swingable toward each other and having plate means at their lower ends to trap an animal therebetween in said trapping zone, means normally disposing said depending members in open position, means for moving said members to and holding them in entrapping position, means for moving said depending members as a unit to move an animal trapped between said plate means to said disposal zone, one of said plate means being movable with respect to its associated depending member, and means for automatically moving said last mentioned plate means to dislodge a trapped animal at said disposal zone.

8. An animal trap comprising a casing having a trapping zone and a disposal zone, a pair of depending members swingable toward each other and having plate means at their lower ends to trap an animal therebetween in said trapping zone, means normally disposing said depending members in open position, means for moving said members to and holding them in entrapping position, means for moving said depending members as a unit to move an animal trapped between said plate means to said disposal zone, one of said plate means being pivotally connected to its associated depending member at its lower edge for movement about a horizontal axis and means operable upon terminal movement to said disposing zone for rotating said last mentioned plate means to move its upper edge toward the other plate means to traverse the space therebetween and dislodge a trapped animal.

9. An animal trap comprising a casing having a trapping zone and a disposal zone, a pair of depending members swingable toward each other and having plate means at their lower ends to trap an animal therebetween in said trapping zone, means normally disposing said depending members in open position, means for moving said members to and holding them in entrapping position, means for moving said depending members as a unit to move an animal trapped between said plate means to said disposal zone, one of said plate means being pivotally connected to its associated depending member at its lower edge for movement about a horizontal axis and link means having a fixed pivot axis and a pivotal connection with the upper portion of said last mentioned plate means whereby movement of said last mentioned plate means to said disposing zone produces rotation thereof to move its upper edge toward the other plate means to traverse the space therebetween and dislodge a trapped animal.

10. An animal trap comprising a casing having a trapping zone and a disposal zone, a pair of depending members swingable toward each other and having plate means at their lower ends to trap an animal therebetween in said trapping zone, means normally disposing said depending members in open position, means for moving said members to and holding them in entrapping position, means for moving said depending members laterally as a unit to move an animal trapped between said plate means to said disposal zone, a substantially horizontally extending wall element disposed above said plate means at said trapping zone to define such zone, and means for dislodging an animal from between said plate means at said disposal zone.

CHESTER W. CRUMRINE.

REFERENCES CITED

The following references are of record in the file of this patent:

UNITED STATES PATENTS

| Number | Name | Date |
|---|---|---|
| 463,238 | Wigger | Nov. 17, 1891 |
| 1,063,715 | McCue | June 3, 1913 |
| 1,116,565 | Clow | Nov. 10, 1914 |
| 2,229,300 | Montroy | Jan. 21, 1941 |
| 2,312,209 | Colwell et al. | Feb. 23, 1943 |
| 2,348,729 | Crumrine | May 16, 1944 |
| 2,360,651 | Crumrine | Oct. 17, 1944 |